A. C. WOLLENSAK.
LOAD INDICATOR FOR VEHICLES.
APPLICATION FILED AUG. 17, 1916.
1,225,094.
Patented May 8, 1917.
2 SHEETS—SHEET 1.
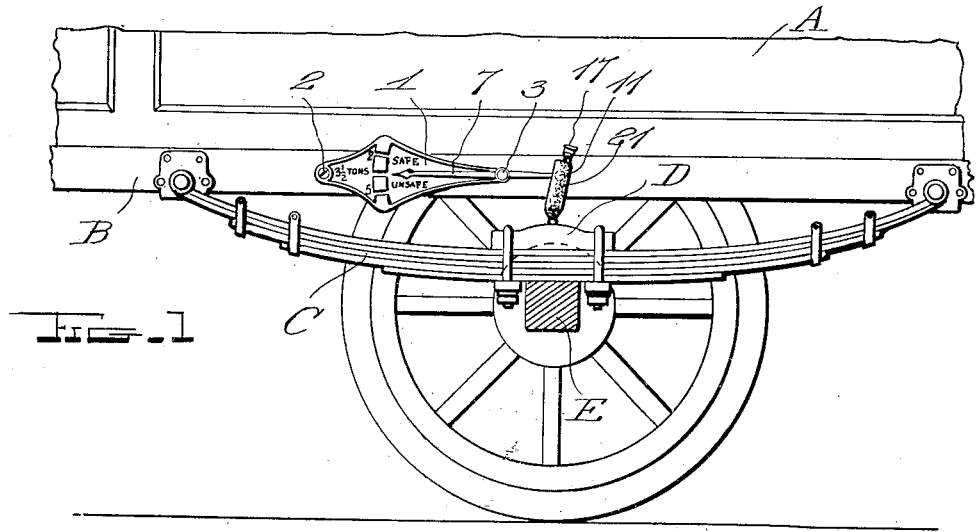
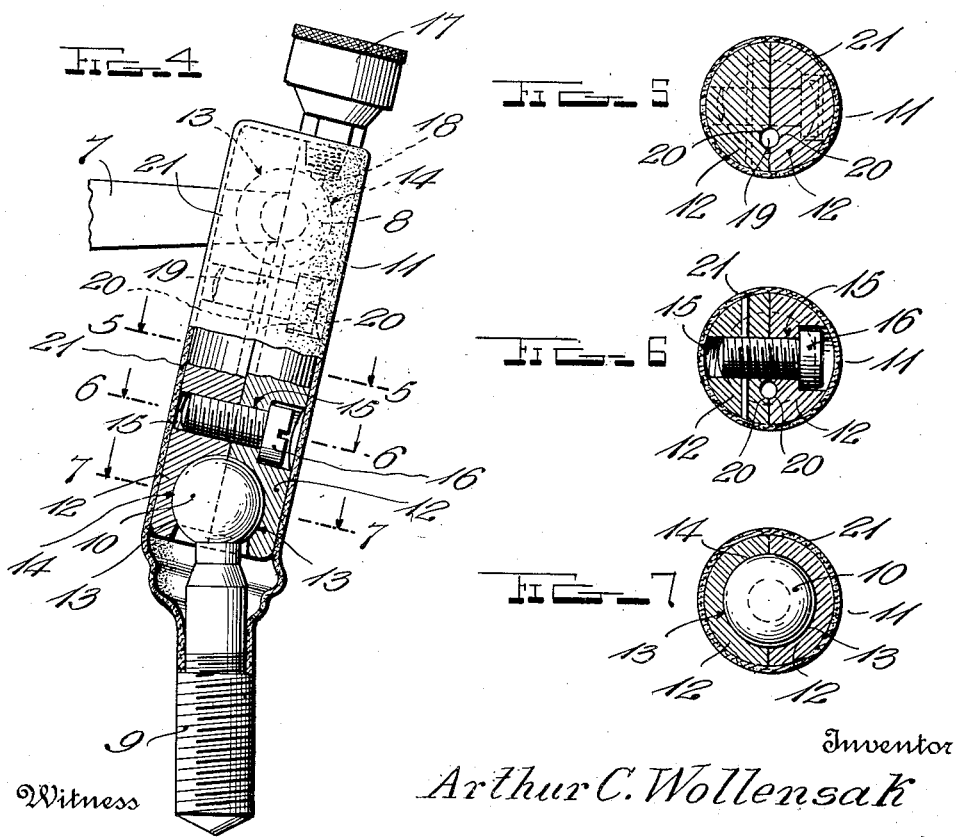
Inventor
Arthur C. Wollensak

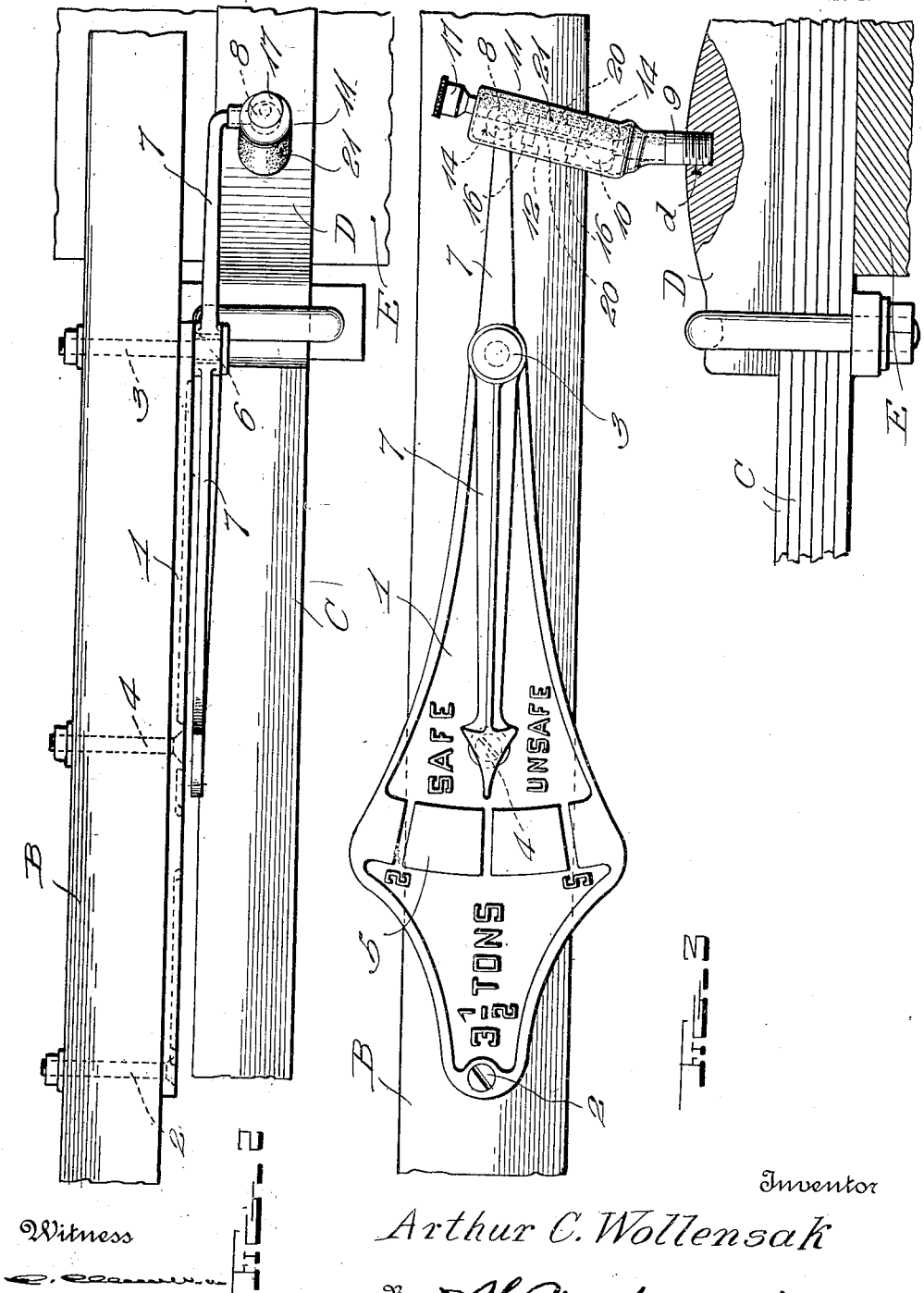

UNITED STATES PATENT OFFICE.

ARTHUR C. WOLLENSAK, OF MILWAUKEE, WISCONSIN.

LOAD-INDICATOR FOR VEHICLES.

1,225,094.    Specification of Letters Patent.    Patented May 8, 1917.

Application filed August 17, 1916. Serial No. 115,460.

*To all whom it may concern:*

Be it known that I, ARTHUR C. WOLLENSAK, a citizen of the United States, residing at Milwaukee, in the county of Milwaukee and State of Wisconsin, have invented certain new and useful Improvements in Load-Indicators for Vehicles; and I do declare the following to be a full, clear, and exact description of the invention, such as will enable others skilled in the art to which it appertains to make and use the same.

This invention relates to a load indicator for vehicles.

The primary object of the invention is to provide an efficient means for determining the load carried by a vehicle, and in that connection, to determine whether the same is overloaded or not.

Another object of the invention is to provide a device of this character having an improved means for adjustably connecting the same to the vehicle.

A further object of the invention is to generally improve upon devices of this character by the provision of a device which will be simple, strong and durable and comparatively inexpensive in construction, efficient and reliable in operation, and well adapted to the purpose for which it is designed.

With these and numerous other objects in view, the invention consists of certain novel features of construction and the combination and arrangement of parts as will be hereinafter fully described and claimed.

In the accompanying drawings forming a part of the application, and in which similar reference characters designate like parts throughout the several views:—

Figure 1 is a side elevation of a portion of a motor truck, one of the wheels of which being removed and the axle in section, showing the device constructed in accordance with this invention applied thereto, said device indicating a partial load carried by the body of the truck;

Fig. 2 is a top plan view of a portion of the truck taken on an enlarged scale illustrating one of the indicators;

Fig. 3 is a side elevation of the same;

Fig. 4 is an enlarged vertical sectional view, partly in elevation, of the link which connects the pointer with the non-yieldably mounted portion of the truck; and Figs. 5, 6 and 7 are transverse sectional views taken on the lines 5—5, 6—6 and 7—7 of Fig. 4.

Referring more particularly to the accompanying drawings, the numeral 1 designates a plate which is preferably constructed of cast or stamped metal and having ridges on its front face along its edges for the purpose of strengthening the same as well as to give it a comparatively neat appearance. This plate 1 is provided at two of its opposite corners with apertures through which extend bolts 2 and 3 which secure the same to the side bars B of the chassis of the vehicle with which it is particularly designed to be used. A third bolt 4 may, if desired be extended through the plate midway between the above mentioned bolts. Extending across the central portion of the plates 1 is a scale 5, which is graduated in numerals or other characteristic designations to determine the load which is placed upon the chassis.

The bolt 3 is provided at its headed end with a hub portion 6 on which is pivotally mounted intermediate of its ends a pointer 7. The inner end of the pointer 7 coöperates with a scale, while the outer end is bent laterally outward at right angles and provided with a ball 8.

The spring clip D of the vehicle is provided with an internally threaded socket $d$ into which is threaded the lower end of a bolt 9. This bolt 9 is provided at its upper end with a ball 10.

The numeral 11 represents, as a whole, a link member, which comprises specifically a pair of plates 12 having registering recesses 13 in their inner sides near their opposite ends, which, when the plates are clamped together form sockets 14 to receive the aforementioned balls 8 and 10. These plates 12 are further provided with alined internally threaded openings 15 to receive a clamping screw 16, whereby to clamp the same together. The openings 15 in one of the plates are countersunk so as to prevent the projection of the heads of the bolts beyond the outer side of the same.

Threaded to one of the plates 12 at one of its ends is a grease cup 17 for supplying grease through a passage 18 to one of the sockets 14. From this socket the grease is conveyed to the other socket through the passage 19 formed by a pair of opposing grooves 20 arranged in the adjacent sides of the plates 12. To prevent the grease from leaking from the link 11 and getting on other parts of the vehicle the former is covered with a leather covering 21, the lower end of which fits tightly around the upper end of this bolt 9.

In use, one of the indicators above described is placed on each side of a motor truck at the rear end thereof, and for trucks which carry a considerable percentage of their load on their front tires, an indicator may be placed on each side at the front end also. The screw 9 is so adjusted with respect to the spring clip D that the pointer coincides with the amount on the dial when the truck has been loaded with the corresponding indicated load. The purpose of the grease cup and passage will be obvious.

The device need not necessarily be attached to the same parts of the vehicle as explained above, so long as the plate 1 is attached to the body or some portion of the vehicle supported by the springs of the same, while the link 11 is connected to a portion of the vehicle not supported by the springs. The registering of the load is due to the distortion of the springs of the vehicle under said load.

This device, besides being particularly adaptable to motor trucks, is equally well suited for railway freight cars, and may be used on any type of vehicle mounted on any type of springs.

From the foregoing description taken in connection with the accompanying drawings, the construction and operation of the invention will be readily understood.

Various changes in form, proportion, and in the minor details of construction, may be resorted to without departing from the spirit of this invention, and hence I do not wish to be limited to the construction herein shown and described other than that set forth in the appended claims.

I claim:

1. A load indicator for vehicles comprising a plate provided with means for attachment to the body of a vehicle and having a scale thereon, an indicating pointer pivotally mounted intermediate its ends on said plate and having a ball on its outer end, a link having sockets in its opposite ends, said ball being retained in one of said sockets, and a screw having a ball on one end retained in the other socket, said screw being adapted to be attached to a portion of the vehicle not supported by the springs thereof.

2. A load indicator for vehicles comprising a plate provided with means for attachment to the body of a vehicle and having a scale thereon, an indicating pointer pivotally mounted intermediate its ends on said plate and having a ball on its outer end, a link composed of a pair of plates clamped together and having opposing recesses in their adjacent sides near their opposite ends to form sockets, said ball being retained in one of said sockets, a screw having a ball on one end thereof retained in the other socket, said screw being adapted to be attached to a portion of the vehicle not supported by the springs thereof.

3. A load indicator for vehicles comprising a plate provided with means for attachment to the body of a vehicle and having a scale thereon, an indicating pointer pivotally mounted intermediate its ends on said plate and having a ball on its outer end, a link composed of a pair of plates clamped together and having recesses in their adjacent sides near their opposite ends to form sockets, said ball being retained in one of said sockets, the adjacent sides of said plates being also provided with opposing grooves to form a channel extending through one socket to the other, a grease cup attached to one of said plates, a passage extending through the latter and communicating with said grease cup and one of said sockets, and a screw having a ball on one end thereof retained in the other socket, said screw being adapted to be attached to a portion of the vehicle not supported by the springs thereof.

4. A load indicator for vehicles comprising a diamond-shaped plate having a scale extending across the central portion thereof, an indicating pointer pivotally mounted intermediate its ends on one end of said plate for coöperation with said scale, the outer end of said pointer being bent laterally outwardly at right angles, and a link pivotally connected at one end to the laterally bent end of said pointer, said link being provided with means at its other end for attachment to a portion of the vehicle not supported by the springs.

In testimony whereof I have hereunto set my hand in the presence of two subscribing witnesses.

ARTHUR C. WOLLENSAK.

Witnesses:
 EDW. A. VOGEL,
 NIC. WOLLENSAK.

Copies of this patent may be obtained for five cents each, by addressing the "Commissioner of Patents, Washington, D. C."